March 8, 1927.
B. F. SEYMOUR
1,620,136
COMBINED RESILIENT TRANSMISSION AND BEARING
Filed Feb. 17, 1922
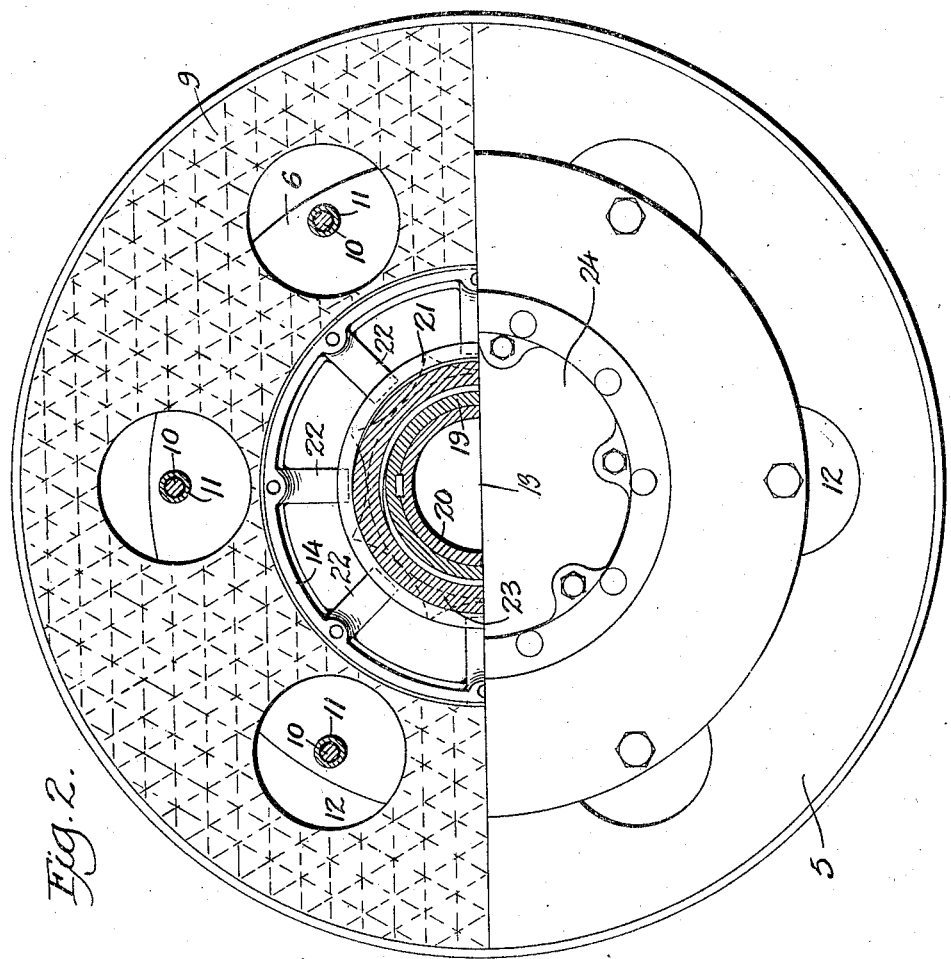
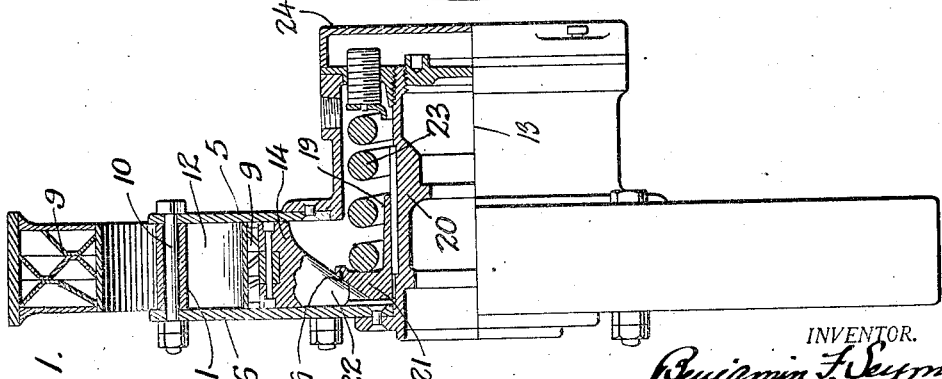
INVENTOR.
Benjamin F. Seymour
BY
ATTORNEY.

Patented Mar. 8, 1927.

1,620,136

UNITED STATES PATENT OFFICE.

BENJAMIN F. SEYMOUR, OF WASHINGTON, DISTRICT OF COLUMBIA.

COMBINED RESILIENT TRANSMISSION AND BEARING.

Application filed February 17, 1922. Serial No. 537,251.

The present invention relates to resilient transmission and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel having the necessary strength may possess the desired resilient qualities and also give the necessary transmission medium between the wheel proper and the motive power of the vehicle.

The present disclosure is proposed as an improvement over the type of resilient transmission and bearing set forth in my co-pending applications Serial No. 302,416, filed June 7, 1919, Patent No. 1,477,910, December 18, 1923 and Serial No. 310,970 filed July 15, 1919, Patent No. 1,474,122, November 13, 1923.

The invention is shown by way of illustration in the accompanying drawings, wherein:

Figure 1 is a central sectional view showing the application of the device to a vehicle wheel; and Figure 2, a side elevational view thereof, partly in section.

Referring to the construction in further detail and wherein like reference characters designate corresponding parts, the construction consists of a hub portion formed of two side plates, or housing members, 5 and 6, which are disposed against the inner rim portion 9 of the wheel, as shown. The two hub members 5 and 6 are secured to the wheel rim by the series of bolts 10 passing through sleeves 11 that serve as spacing elements and which are located within the spaces, or chambers 12, as indicated in Figures 1 and 2. It will be understood, of course, that said spaces 12 are provided to allow the wheel rim to have limited radial angular movement with respect to the axis 13 of the wheel.

The resilient transmission and bearing device per se consists of a centrally disposed flange or inner rim portion 14 formed on or detachably secured to the rim portion 9, and having preferably tapering inner surface from which project centerwards a plurality of radially arranged cam elements or webs 22. Each of these webs or elements is substantially of a triangular configuration having a half-around cam edge inclined against the hub axis. The several webs or elements 22 cooperate with correspondingly recessed portions 26 formed in the cam head 21 which is constructed integrally with the sleeve 19 splined on the hub portion 20 and axially movable thereon.

The sleeve 19 is held with its recessed portion 26 in operative position against the cam elements 22 and under the required pressure by the spring 23 which seats against the cone head 21 and the hub closure cap 24, as shown.

It will therefore be seen from the foregoing that any motion or shock of the shaft or axle will transmit a like movement to the wheel rim and that such transmission will be flexible or resilient in nature. And it will be further seen that any jarring motion imparted to the wheel will be resiliently taken up by the cooperating cam elements together with the spring.

The illustration shows a particular embodiment of the invention, though it is understood, of course, that the invention may be carried out in other ways, and that therefore the present disclosure is to be considered in an illustrative sense only and not as a limiting one.

Having thus fully described my invention, what I claim as new and desire to secure by Letters Patent, is:

1. In a combined resilient bearing and drive for vehicle wheels, the combination of a hub member, a wheel rim member mounted to have limited radial movement on the hub member, said rim member having on one side an annularly arranged series of cam elements substantially triangular in outline situated in radial planes through the hub axis and with their apices pointing centerwards, a sleeve mounted to have axial movement on said hub member, and having cam elements co-operable with said rim cam elements, and a spring mounted on the hub member holding said cam elements in engagement permitting limited radial and circumferential movement between the respective elements and providing the bearing and drive, substantially as set forth.

2. In a combined resilient bearing and drive for vehicle wheels, the combination of a hub member, a rim member mounted to have limited relative movement on said hub member, and having annually arranged cam elements of uniform width and substantially triangular shape in outline with their cam surfaces inclined against the hub axis, a sleeve member axially movable on the hub member, and having an annually arranged series of cam elements co-operable with said rim cam elements, and a resilient member holding said cam elements in engagement permitting limited radial and circumferential movement between the respective elements, substantially as set forth.

3. In a resilient transmission, the combination of resiliently associated driving and driven means and a series of cooperable elements arranged on said driving and driven means, said elements having male and female rounded contacting surfaces respectively inclined against the hub axis and positioned at right angles to each other.

4. In a resilient transmission adapted to a vehicle wheel, the combination of resiliently associated driving and driven means and a series of cooperable elements arranged on said driving and driven means, said elements having male and female rounded contacting surfaces respectively inclined against the hub axis and positioned at right angles to each other.

5. In a resilient transmission adapted to a vehicle wheel, the combination of resiliently associated driving and driven means and a series of cooperable elements arranged on said driving and driven means, said elements having male and female rounded contacting surfaces respectively inclined against the hub axis and annularly arranged and positioned at right angles to each other.

6. In a resilient transmission adapted to a vehicle wheel, the combination of resiliently associated driving and driven means and a series of cooperable elements arranged on said driving and driven means, said elements having male and female rounded contacting surfaces respectively inclined against the hub axis and annularly arranged and operable substantially at right angles to each other.

In testimony whereof I affix my signature.

BENJAMIN-F. SEYMOUR.